United States Patent
Lu

(10) Patent No.: US 9,575,342 B2
(45) Date of Patent: Feb. 21, 2017

(54) LIQUID CRYSTAL DISPLAY DEVICE COMPRISING TWO DIFFERENT PIXEL ELECTRODES CONNECTED TO DIFFERENT TFTS IN A PIXEL

(75) Inventor: Jiaoming Lu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 356 days.

(21) Appl. No.: 13/698,421

(22) PCT Filed: Aug. 14, 2012

(86) PCT No.: PCT/CN2012/080106
§ 371 (c)(1),
(2), (4) Date: Nov. 16, 2012

(87) PCT Pub. No.: WO2013/023579
PCT Pub. Date: Feb. 21, 2013

(65) Prior Publication Data
US 2013/0148047 A1 Jun. 13, 2013

(30) Foreign Application Priority Data

Aug. 16, 2011 (CN) .......................... 2011 1 0234465

(51) Int. Cl.
*G09G 3/36* (2006.01)
*G02F 1/133* (2006.01)
(Continued)

(52) U.S. Cl.
CPC ..... *G02F 1/13306* (2013.01); *G02F 1/134309* (2013.01); *G09G 3/36* (2013.01);
(Continued)

(58) Field of Classification Search
CPC .............. G09G 3/36; G09G 3/34; G09G 5/00;
G09G 5/08; G06F 3/038; G06F 3/033; G06F 3/02; G06F 3/041; G06F 3/045; G06F 3/042; G06K 11/06; G08C 21/00
(Continued)

(56) References Cited

U.S. PATENT DOCUMENTS

2001/0045933 A1* 11/2001 Sakaigawa et al. ............ 345/98
2003/0189537 A1* 10/2003 Yun ................................. 345/87
(Continued)

FOREIGN PATENT DOCUMENTS

| CN | 1797144 A | 7/2006 |
|---|---|---|
| CN | 101609235 A | 12/2009 |

(Continued)

OTHER PUBLICATIONS

International Search Report mailed Oct. 18, 2012; PCT/CN2012/080106.
(Continued)

*Primary Examiner* — Pegeman Karimi
(74) *Attorney, Agent, or Firm* — Ladas & Parry LLP

(57) ABSTRACT

A liquid crystal display device is disclosed, which has improved transmittance, and which meanwhile can obtain a higher contrast and maintain a lower cost. The device comprises a color filter substrate, an array substrate, and a liquid crystal layer sealed between the color filter substrate and the array substrate. The array substrate comprises a first pixel electrode and a second pixel electrode, the first pixel electrode and the second pixel electrode being arranged at an interval, and applied with AC voltages of equal frequency but opposite phase, respectively. Also, a method for driving the liquid crystal display device is disclosed.

13 Claims, 4 Drawing Sheets

(51) Int. Cl.
  *G02F 1/1343* (2006.01)
  *G02F 1/139* (2006.01)
(52) U.S. Cl.
  CPC ...... *G02F 1/1393* (2013.01); *G02F 1/134363* (2013.01); *G02F 2001/134381* (2013.01); *G09G 2230/00* (2013.01); *G09G 2300/0426* (2013.01); *G09G 2310/06* (2013.01)
(58) Field of Classification Search
  USPC .......................................................... 349/56
  See application file for complete search history.

(56) References Cited

U.S. PATENT DOCUMENTS

| | | |
|---|---|---|
| 2006/0146248 A1 | 7/2006 | Park |
| 2007/0154629 A1 | 7/2007 | Fujita |
| 2009/0310047 A1 | 12/2009 | Shin et al. |
| 2010/0232024 A1 | 9/2010 | Murota et al. |
| 2010/0245700 A1 | 9/2010 | Zhao et al. |
| 2011/0310337 A1 | 12/2011 | Ishihara et al. |
| 2012/0013594 A1* | 1/2012 | Ishihara et al. ............... 345/211 |

FOREIGN PATENT DOCUMENTS

| | | |
|---|---|---|
| CN | 101852953 A | 10/2010 |
| EP | 2437107 A1 | 4/2012 |
| EP | 2437110 A1 | 4/2012 |
| JP | 10-186351 A | 7/1998 |
| JP | 2007-101972 A | 4/2007 |
| JP | 2009-053414 A | 3/2009 |
| KR | 20060060696 A | 6/2006 |
| KR | 20090021189 A | 2/2009 |
| WO | 2010137217 A1 | 12/2010 |
| WO | 2010137386 A1 | 12/2010 |
| WO | WO 2010137217 A1 * | 12/2010 |

OTHER PUBLICATIONS

International Preliminary Report on Patentability dated Feb. 18, 2014; PCT/CN2012/080106.
First Chinese Office Action dated Aug. 20, 2013; Appln. No. 201110234465.X.
Second Chinese Office Action dated Oct. 31, 2013; Appln. No. 201110234465.X.
First Korean Office Action dated Dec. 29, 2013; Appln. No. KR10-2012-7030425.
Chinese Third Office Action dated Mar. 20, 2014; Appln. No. 201110234465.X.
Chinese Rejection Decision Appln. No, 201110234465X; Dated Aug. 27, 2014.
Korean Examination Opinion dated Jul. 31, 2014; Appln. No. 10-2012-7030425.
Chinese Reexamination Notification dated Feb. 11, 2015; Appln. No. 201110234465.X.
In Young Cho, et al; "11.2: New Vertical Alignment Liquid Crystal Device with Fast Response Time and Color Shift", 28th International Display Research Conference (IDRC'08), Jan. 1, 2008, pp. 246-248, XP009174144.
Extended European Search Report dated May 1, 2015; Appln No. 12778024.5—1904/2597510 PCT/CN2012080106.
First Korean Examination Opinion AppLn. No. 10-2012-7030425; Dated Mar. 30, 2015.
Second Korean Examination Opinion Appln. No. 10-2012-7030425; Dated May 20, 2015.
Japanese Office Action dated Apr. 4, 2016; Appln. No. 2014-525296.
Japanese Office Action dated Nov. 27, 2016: Appln. No. JP2014-525296.

* cited by examiner

LIQUID CRYSTAL DISPLAY DEVICE COMPRISING TWO DIFFERENT PIXEL ELECTRODES CONNECTED TO DIFFERENT TFTS IN A PIXEL

CROSS REFERENCE TO RELATED APPLICATIONS

This application is a national stage application under 35 U.S.C. 371 and claims the benefit of PCT Application No. PCT/CN2012/080106 having an international filing date of Aug. 14, 2012, which designated the United States, which PCT application claimed the benefit of Chinese Application No. 201110234465.X filed Aug. 16, 2011, the disclosure of both the above-identified applications are incorporated herein by reference.

TECHNICAL FIELD

The present disclosure relates to a liquid crystal display device and a method for driving a liquid crystal display device.

BACKGROUND

It is well known that, existing thin film transistor liquid crystal displays (TFT-LCDs) are used in information display devices, such as a portable terminal device's information display window, a notebook computer's image display, and a laptop computer's monitor, etc. TFT-LCDs are the only display devices that fully catch up and exceed cathode ray tube (CRT) displays in general performance such as brightness, contrast, power consumption, lifespan, volume and weight, etc. It has advantages of excellent performance and high degree of automation, etc.

The TFT-LCD technology has been comparatively mature, as the long plagued three major problems, i.e., viewing angle, color saturation and brightness, in connection with an LCD flat panel display have been resolved.

In the prior art, there has been proposed a transverse bend alignment (TBA) mode based on an IPS electrode structure and vertical alignment of liquid crystal. In the TBA mode, since the liquid crystal is positive liquid crystal in vertical alignment, it is possible to obtain a higher contrast and maintain a lower cost. As shown in FIG. 1, the TBA mode liquid crystal display device comprises adjacent electrodes, which are respectively a pixel electrode 5 and a common electrode 1. The common electrode 1 is applied with a constant direct-current (DC) voltage, and the electrical potential difference between the common electrode 1 and the pixel electrode 5 is relatively small, and the field intensity of the generated horizontal electric field is therefore relatively weak, which is not beneficial for the liquid crystal molecules to tilt in a horizontal direction, and thus makes the transmittance decreased. Therefore, the TBA mode has a disadvantage of a lower transmittance, which can not meet the needs in some occasions.

SUMMARY

According to an embodiment of the present disclosure, there is provided a liquid crystal display device, which comprises: a color filter substrate, an array substrate, and a liquid crystal layer sealed between the color filter substrate and the array substrate, wherein the array substrate comprises at least one first pixel electrode and at least one second pixel electrode, and the first pixel electrode and the second pixel electrode are arranged at an interval, and applied with alternating current (AC) voltages of equal frequency but opposite phase, respectively.

Preferably, the AC voltages respectively applied on the first pixel electrode and the second pixel electrode have same amplitudes.

Preferably, the color filter substrate comprises a common electrode.

More preferably, one side of the common electrode facing the array substrate, there is covered with a protective layer.

The liquid crystal layer may comprise positive liquid crystal molecules therein.

The first pixel electrode and the second pixel electrode may be made of a same indium-tin oxide layer through a patterning process.

In some examples, the first pixel electrode and the second pixel electrode may be line-type strip-like electrodes.

The first pixel electrode and the second pixel electrode may employ an indium-tin oxide semiconductor material.

Preferably, the liquid crystal molecules in the liquid crystal layer are in vertical alignment when not supplied with power.

According to an embodiment of the present disclosure, there is also provided a method for driving a liquid crystal display device, which is applied in a liquid crystal display device having a color filter substrate, an array substrate, and a liquid crystal layer sealed between the color filter substrate and the array substrate, wherein the array substrate comprises at least one first pixel electrode and at least one second pixel electrode, the first pixel electrode and the second pixel electrode being arranged at an interval, the method comprising: applying AC voltages of equal frequency but opposite phase to the first pixel electrode and the second pixel electrode on the array substrate, respectively.

Preferably, the AC voltages respectively applied on the first pixel electrode and the second pixel electrode have same amplitudes.

Preferably, under the effect of the positive/negative voltages being applied, the liquid crystal molecules, located at positions where the field intensity in a horizontal direction is greater than in a vertical direction in the liquid crystal layer, are approximately in a horizontal state.

In the liquid crystal display device and the method for driving a liquid crystal display device, according to the embodiments of the present disclosure, the array substrate comprises a first pixel electrode and a second pixel electrode, the first pixel electrode and the second pixel electrode being arranged at an interval, and applied with AC voltages of equal frequency but opposite phase, respectively. This enhances the field intensity of a horizontal electric field, causing the liquid crystal molecules prone to be inclined to a horizontal state, thereby improving the transmittance of the liquid crystal layer.

DETAILED DESCRIPTION

A liquid crystal display device in an embodiment of the present disclosure comprises: a color filter substrate, an array substrate, and a liquid crystal layer sealed between the color filter substrate and the array substrate. The array substrate comprises a first pixel electrode and a second pixel electrode. The first pixel electrode and the second pixel electrode are arranged at an interval, and are respectively applied with alternating current (AC) voltages of equal frequency but opposite phase. This enhances the field intensity of the horizontal electric field, causing the liquid crystal molecules prone to be inclined to a horizontal state, thereby improving the transmittance of the liquid crystal layer.

In some examples, the AC voltages respectively applied on the first pixel electrode and the second pixel electrode may have same amplitudes.

Figure 1:
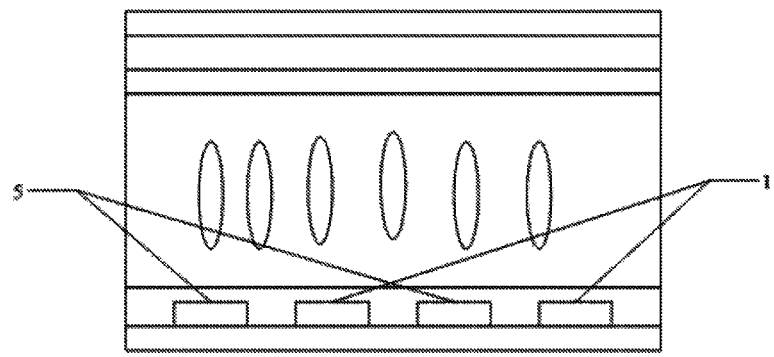
FIG. 1 is a specific structural view of a liquid crystal display device in the prior art.
Figure 2:
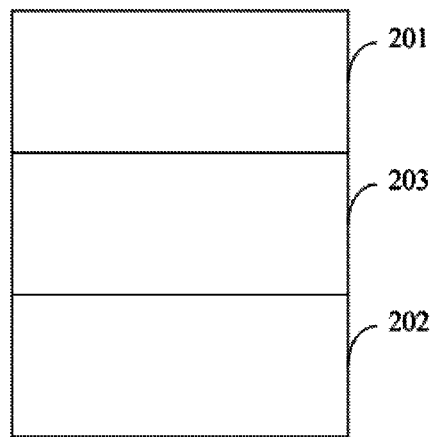
FIG. 2 is a main structural view of a liquid crystal display device in an embodiment of the present disclosure.

Referring to FIG. 2, the liquid crystal display device in this embodiment of the disclosure comprises a color filter substrate 201, an array substrate 202, and a liquid crystal layer 203 sealed between the color filter substrate 201 and the array substrate 202.

The liquid crystal display device in this embodiment of the disclosure may adopt a PLVA (Positive Liquid crystal Vertical Alignment) mode.

Figure 3A:
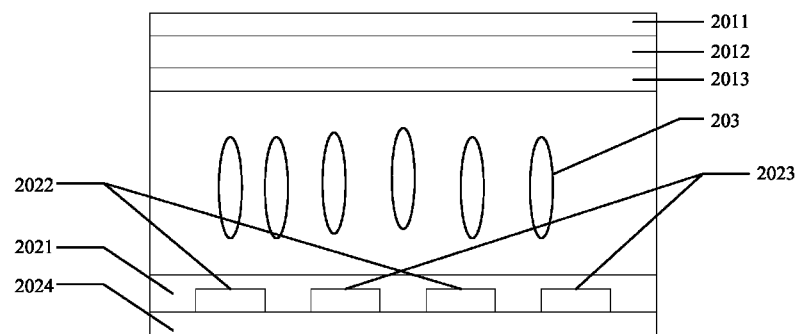
FIG. 3A is a schematic view of a liquid crystal display device in an embodiment of the present disclosure in an "OFF" state.
Figure 3B:
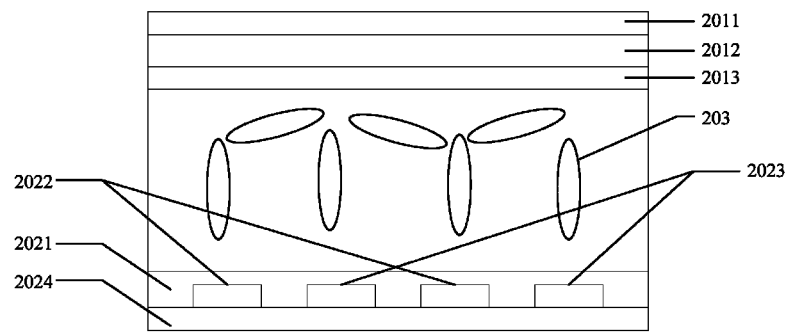
FIG. 3B is a schematic view of a liquid crystal display device in an embodiment of the present disclosure in an "ON" state.
Figure 3C:
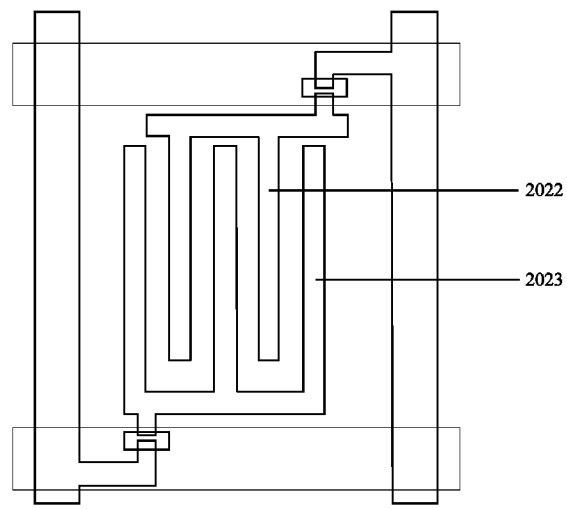
FIG. 3C is a plane schematic view of a pixel in an embodiment of the present disclosure.

Referring to FIG. 3A, it is a schematic view of the device in this embodiment of the disclosure in an "OFF" state, i.e. when power is off. FIG. 3B is a schematic view of the device in this embodiment of the disclosure in an "ON" state, i.e. when power is on. In this embodiment of the disclosure, the structure of the device is explained with such an example in which the device is placed in a horizontal plane, the color filter substrate 201 is located on the upper side of the device, and the array substrate 202 is located on the lower side of the device. It should be understood that, here the wordings for orientations such as "upper", "lower", etc., are merely for the convenience of understanding, instead of being restrictive. The color filter substrate 201 comprises a common electrode 2011 and a protective layer 2012 covering one side of the common electrode 2011 facing the array substrate 202; the color filter substrate 201 further comprises a first alignment layer 2013; and in the device, the alignment layer is divided into two parts, located at the upper and lower sides of the liquid crystal layer 203 respectively. Among the layers, the first alignment layer 2013 at the upper side of the liquid crystal layer 203 is located inside the color filter substrate 201 and covering the protective layer 2012, while the second alignment layer 2021 at the lower side of the liquid crystal layer 203 is located inside the array substrate 202 and covering the pixel electrodes. FIG. 3C is a plane schematic view of a pixel in the embodiment of the present disclosure.

The array substrate 202 comprises: a first pixel electrode 2022, a second pixel electrode 2023 and the second alignment layer 2021 at the lower side of the liquid crystal layer 203, as well as a passivation layer 2024 at the lower side of the second alignment layer 2021.

The common electrode 2011 is located on the color filter substrate 201, covering the color filters, and a voltage signal applied to the common electrode 2011 may be a constant DC voltage signal. Moreover, the common electrode 2011 may be made of a transparent ITO (indium-tin oxide semiconductor) material.

Figure 4:
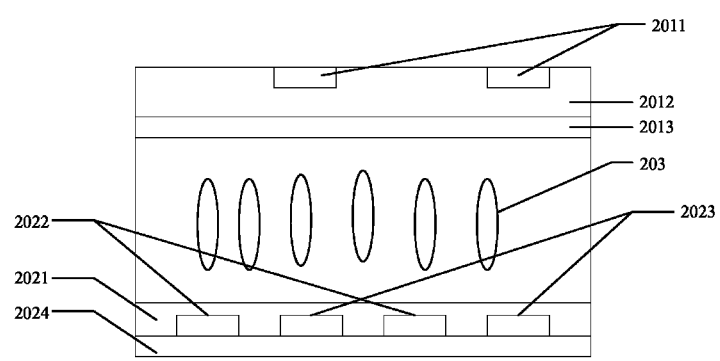
FIG. 4 is a specific structural view of a liquid crystal display device in an embodiment of the present disclosure in which a common electrode is a strip-like electrode.

Alternatively, as shown in FIG. 4, the common electrode 2011 may adopt a strip-like electrode, and thus can increase the transmittance.

The protective layer 2012 covers the common electrode 2011 and functions to reduce the impact of a vertical electric field, which is generated by the electrical potential difference between the common electrode 2011 and the first and second pixel electrodes 2022, 2023, on liquid crystal orientation as much as possible.

The first alignment layer 2013 at the upper side of the liquid crystal layer 203 is located inside the color filter substrate 201, covering the protective layer 2012, while the second alignment layer 2021 at the lower side of the liquid crystal layer 203 is located inside the array substrate 202, covering the first pixel electrode 2022 and on the second pixel electrode 2023. The first pixel electrode 2022 and the second pixel electrode 2023 are located on the passivation layer 2024. The function of both the first alignment layer 2013 and the second alignment layer 2021 is to make liquid crystal molecules orientated homogeneously.

The liquid crystal layer 203 is located between the first alignment layer 2013 and the second alignment layer 2021. The liquid crystal in the liquid crystal layer 203 may be negative liquid crystal or positive liquid crystal. Preferably, the liquid crystal in the liquid crystal layer 203 is positive liquid crystal. Positive liquid crystal, unlike negative liquid crystal having a higher viscosity, has a faster response speed and is inexpensive. Because the first pixel electrode 2022 and the second pixel electrode 2023 are made of a same indium-tin oxide layer through a patterning process and covered by the second alignment layer 2021 thereon, the liquid crystal molecules in the liquid crystal layer 203 will been oriented under the effect of an applied horizontal electric field, and inclined to a horizontal arrangement. In this way, the LCD can work to display. However, due to the presence of an electric field between the pixel electrodes and the common electrode 2011, when the liquid crystal layer 203 is applied with a voltage, there exists not only an electric field in a vertical direction but also an electric field in a horizontal direction. Liquid crystal molecules locating, at positions where the field intensity in a horizontal direction is greater than in a vertical direction, will occur deflecting. But, some liquid crystal molecules, at positions where the field intensity in a horizontal direction is only slightly greater than in a vertical direction, may have a smaller deflection angle. The greater the field intensity in a horizontal direction at a position is, the more the liquid crystal molecules at that position deflect in a horizontal direction and is inclined to a horizontal arrangement. But there may be also a part of the liquid crystal molecules, located at positions where the field intensity in a horizontal direction is equal to or less than in a vertical direction, and this part of the liquid crystal molecules may be not deflected and still maintain their vertically arranged states. Due to limitations of process, the liquid crystal molecules can not reach standard horizontal arrangement, and therefore only a part of the liquid crystal molecules in the liquid crystal layer 203 are deflected close to the horizontal arrangement. In the embodiment of the present disclosure, when the device is in a full black state, i.e., no power is applied, the liquid crystal is in a vertical alignment. In embodiment of the present disclosure, a horizontal direction refers to the direction of an electric field formed between the first pixel electrode 2022 and the second pixel electrode 2023, while a vertical direction refers to the direction perpendicular to the horizontal direction.

Figure 5A:
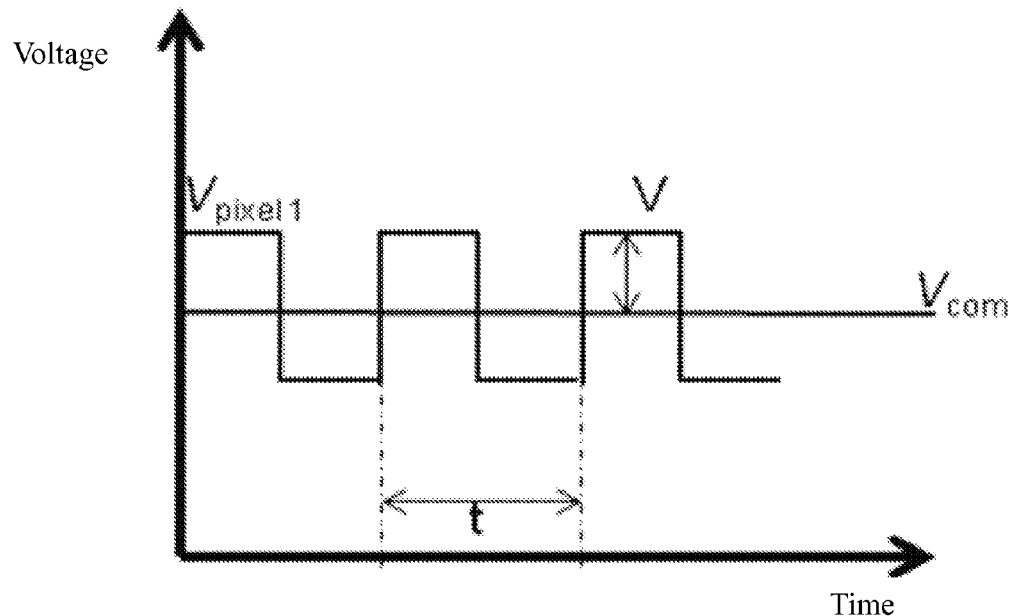
FIG. 5A is a voltage timing diagram of a first pixel electrode applied with a voltage signal in an embodiment of the present disclosure.
Figure 5B:
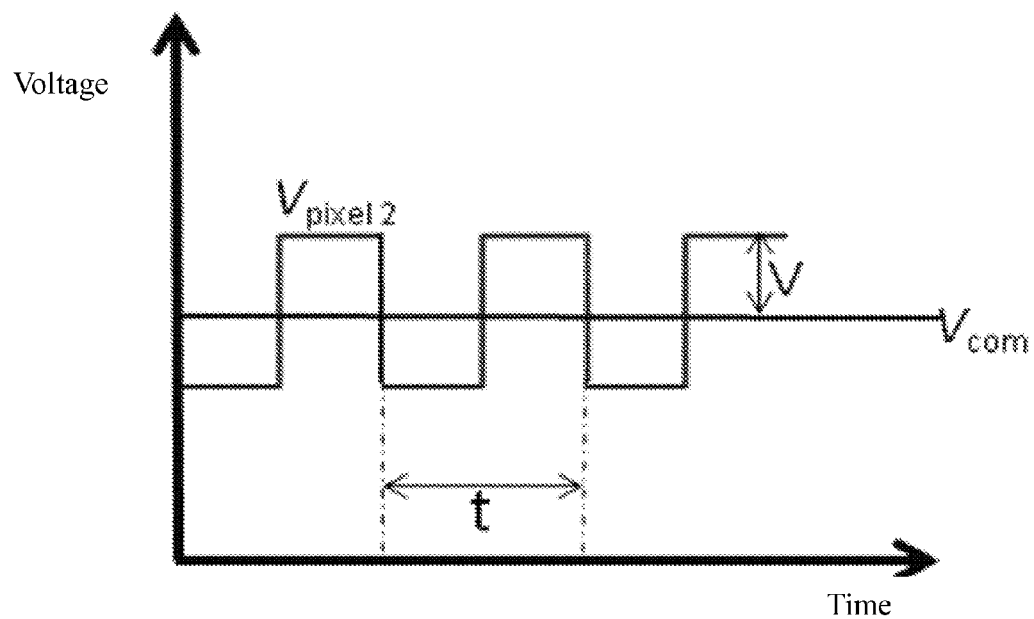
FIG. 5B is a voltage timing diagram of a second pixel electrode applied with a voltage signal in an embodiment of the present disclosure.

The first pixel electrode 2022 and the second pixel electrode 2023 are covered by a second alignment layer 2021 thereon, and the first pixel electrode 2022 and the second pixel electrode 2023 are arranged at an interval. In the embodiment of the present disclosure, the first pixel electrode 2022 and the second pixel electrode 2023 may be applied with AC voltage signals of equal frequency but opposite phase, respectively, so that the first pixel electrode 2022 and the second pixel electrode 2023—when power is on—have voltages of opposite polarity at a same moment. For example, at a moment T1, the first pixel electrode 2022 may have a positive voltage, and the second pixel electrode 2023 may have a negative voltage. Preferably, the AC voltages may have same amplitudes. As shown in FIG. 5A, it is a voltage timing diagram of a voltage signal applied to the first pixel electrode 2022 in an embodiment of the present disclosure, in which Vpixel1 refers to the first pixel electrode 2022, and Vcom is the voltage signal applied to the common electrode, which may be a DC signal. As shown in FIG. 5B, it is a voltage timing diagram of a voltage signal applied to the second pixel electrode 2023 in an embodiment of the present disclosure, in which Vpixel2 refers to the second pixel electrode 2023. It can be seen that, at a same moment, the first pixel electrode 2022 and the second pixel electrode 2023 have voltages of equal frequency, same amplitude but opposite phase. Under the effect of the voltages applied, the field intensity of the horizontal electric field is stronger, which makes the liquid crystal molecules in the liquid crystal layer 203 more inclined to a horizontal arrangement due to the effect of the electric field, thereby improving the transmittance of the LCD. The first pixel electrode 2022 and the second pixel electrode 2023 may be made of an ITO material.

In the embodiment of the present disclosure, the first pixel electrode 2022 and the second pixel electrode 2023 may be line-type strip-like electrodes, also may be bent strip-like electrodes.

The passivation layer 2024 is located at the lower side of both the first pixel electrode 2022 and the second the pixel electrode 2023.

Below, a process for liquid crystal displaying in an embodiment of the present disclosure will be introduced.

When no voltage is applied, the liquid crystal molecules rule are regularly and vertically arranged in the liquid crystal layer 203, and at this time the liquid crystal molecules are not orientated. After power is on, an electric field is generated between the first and second pixel electrodes 2022, 2023 and the common electrode, forming an electrical potential difference, thereby driving the liquid crystal molecules to deflect. The direction of the electric field at each liquid crystal molecule's position is not entirely consistent with each other. For example, in FIG. 3A and FIG. 3B, for some liquid crystal molecules, the positively charged first pixel electrode 2022 is at the left side, and the negatively charged second pixel electrode 2023 is at the right side, and the direction of the electric field is from the first pixel electrode 2022 to the second pixel electrode 2023, causing these liquid crystal molecules twist to the their right side to horizontal positions; for some others liquid crystal molecules, the negatively charged second pixel electrode 2023 is at the left side, and the positively charged first pixel electrode 2022 is at the right side, and the direction of the electric field is from the first pixel electrode 2022 to the second pixel electrode 2023, causing these liquid crystal molecules to twist to their left side to horizontal positions. Under different driving voltages, the liquid crystal layer 203 will exhibit different transmittances; the greater the value of the applied voltage is, the more the liquid crystal molecules in the liquid crystal layer 203 are close to a horizontal arrangement, and therefore the higher the transmittance occurs. However, the value of the applied voltage can not be too high, in order to prevent burnout of the device.

The liquid crystal display device in the embodiments of the present disclosure comprises: a color filter substrate, an array substrate, and a liquid crystal layer sealed between the color filter substrate and the array substrate; wherein, the array substrate comprises a first pixel electrode and a second pixel electrode, the first pixel electrode and the second pixel electrode being arranged at an interval, and applied with AC voltages of equal frequency but opposite phase, respectively. This enhances the field intensity of the horizontal electric field, causing the liquid crystal molecules prone to be inclined to a horizontal state (because an absolutely horizontal state can not be achieved in process, and there may be some liquid crystal molecules still in a vertical state, it is only possible to be more approximate to a horizontal state), thereby improving the transmittance of the liquid crystal layer. Preferably, the AC voltages respectively applied on the first pixel electrode and the second pixel electrode have same amplitudes. With positive liquid crystal molecules, low viscosity and fast response are achieved, and the device is inexpensive. Because the liquid crystal is in a vertical alignment, the alignment film rubbing process is not required, reducing dark-state light leakage, thus achieving a high contrast. Moreover, the common electrode may adopt a strip-like electrode, in order to improve transmittance, lower power consumption, and make smaller the impact of the electric field, which is generated by an electrical potential difference between the common electrode and the first pixel electrode 2022 or the second pixel electrode 2023, on the orientation of liquid crystal molecules.

Obviously, various modifications and variations to the present disclosure can be made by the skilled in the art, without departing from the spirit and scope of the present disclosure. Thus, if those modifications and variations of the present disclosure are within the scope of the claims and their equivalents of the present disclosure, the present disclosure is also intended to encompass these variations and modifications.

The invention claimed is:

1. A liquid crystal display device, comprising:
   a color filter substrate, an array substrate provided opposite to the color filter substrate, and a liquid crystal layer sealed between the color filter substrate and the array substrate;
   wherein the array substrate comprises a pixel, which comprises at least one first pixel electrode and at least one second pixel electrode, and the first pixel electrode and the second pixel electrode are arranged at an interval and applied with AC voltages of equal frequency but opposite phase, respectively;
   the color filter substrate comprises a common electrode provided thereon, and one side of the common electrode facing the array substrate is covered with a protective layer and an alignment layer in order;
   the first pixel electrode and the second pixel electrode are respectively connected to a first thin film transistor and a second thin film transistor in the pixel, and a gate electrode of the first thin film transistor and a gate electrode of the second thin film transistor are connected to different gate lines, wherein the first pixel electrode and the second pixel electrode are both entirely disposed between two immediately adjacent data lines.

2. The device according to claim 1, wherein the AC voltages respectively applied on the first pixel electrode and the second pixel electrode have same amplitudes.

3. The device according to claim 1, wherein the liquid crystal layer comprises positive liquid crystal molecules therein.

4. The device according to claim 3, wherein the liquid crystal molecules in the liquid crystal layer are in a vertical alignment when not supplied with power.

5. The device according to claim 1, wherein the first pixel electrode and the second pixel electrode are made of a same indium-tin oxide layer through a patterning process.

6. The device according to claim 5, wherein the first pixel electrode and the second pixel electrode are line-type strip-like electrodes.

7. The device according to claim 1, wherein the first pixel electrode and the second pixel electrode are line-type strip-like electrodes.

8. The device according to claim 1, wherein the first pixel electrode and the second pixel electrode employ an indium-tin oxide semiconductor material.

9. The device according to claim 1, wherein the liquid crystal molecules in the liquid crystal layer are in a vertical alignment when not supplied with power.

10. The device according to claim 1, wherein the common electrode is a strip-like electrode.

11. The device according to claim 1, wherein a source electrode of the first thin film transistor is connected to one of the two adjacent data lines, and a source electrode of the second thin film transistor is connected to the other one of the two adjacent data lines.

12. The device according to claim 1, wherein the first pixel electrode and the second pixel electrode are disposed between two adjacent gate lines.

13. The device according to claim 12, wherein the different gate lines connected to the gate electrode of the first thin film transistor and the gate electrode of the second thin film transistor are the two adjacent gate lines.

* * * * *